US006044955A

United States Patent [19]

Stawniak

[11] Patent Number: 6,044,955

[45] Date of Patent: Apr. 4, 2000

[54] ACCELERATING TRAVELLING WALKWAY WITH LATERALLY AND LONGITUDINALLY DISPLACEABLE STEP PLATES

[75] Inventor: Anderzej Stawniak, Vienna, Austria

[73] Assignee: Inventio AG, Hergiswil, Switzerland

[21] Appl. No.: 09/018,058

[22] Filed: Feb. 3, 1998

[30] Foreign Application Priority Data

Feb. 14, 1997 [EP] European Pat. Off. .............. 97810080

[51] Int. Cl.[7] .................................................... B65G 23/00

[52] U.S. Cl. ........................................... 198/334; 198/792

[58] Field of Search ..................................... 198/334, 792

[56] References Cited

U.S. PATENT DOCUMENTS

| | | | |
|---|---|---|---|
| 3,465,689 | 9/1969 | Ayers et al. | 104/25 |
| 3,580,383 | 5/1971 | Van Der Wal | 198/16 |
| 3,595,364 | 7/1971 | Schoneweiss | 198/335 |
| 3,651,763 | 3/1972 | Iritani | 104/25 |
| 3,793,961 | 2/1974 | Salvadorini | 104/25 |
| 3,903,806 | 9/1975 | Ayres et al. | 198/334 |
| 3,939,959 | 2/1976 | Dunstan et al. | 198/16 MS |
| 4,197,993 | 4/1980 | Dunstan et al. | 198/334 |
| 4,276,976 | 7/1981 | Dunstan et al. | 198/334 |
| 4,732,257 | 3/1988 | Mathis et al. | 198/334 |

*Primary Examiner*—Christopher P. Ellis
*Assistant Examiner*—Joe Dillon, Jr.
*Attorney, Agent, or Firm*—Schweitzer Cornman Gross & Bondell LLP

[57] ABSTRACT

A travelling walkway for conveying of persons, comprises sections with different speeds and with varying speeds, is formed from pivotably interconnected and driven carriers, wherein the length distances between the carriers are variable and step elements, which overlap one another in running direction of the travelling walkway and are displaceable relative to one another, are present on the carriers. Link chains, which are arranged parallel in longitudinal direction and which are transversely connected at the joints by means of step plates to form an articulated lattice variable in length and width, are used as carriers. Lateral guides and guide rollers produce the stretching and pushing together of the articulated lattice required by changes in width. Grooved and smooth drive belts move the articulated lattice at different speeds as necessary. The articulated lattice is horizontally deflected at both ends of the travelling walkway by means of a circulating device.

11 Claims, 4 Drawing Sheets

ACCELERATING TRAVELLING WALKWAY WITH LATERALLY AND LONGITUDINALLY DISPLACEABLE STEP PLATES

The present invention relates to a travelling walkway for conveying of persons, comprising sections with different speeds and sections with variable speeds formed from pivotably interconnected and driven carriers, wherein the length distances between the carriers are variable. Step elements which overlap one another in the running direction of the travelling walkway and are displaceable relative to one another in the running direction of the travelling walkway, are present on the carriers. A respective horizontal deflection of the step elements and carriers is provided at each end of the travelling walkway.

BACKGROUND OF THE INVENTION

U.S. Pat. No. 3,939,959 describes an accelerating and retarding travelling walkway with step plates which overlap the longitudinal direction and are displaceable relative to one another and which are held at one end on roller-guided carriers. The carriers are connected amongst one another by articulation levers and chains, wherein slide-guided rollers at the articulation levers produce a variable spacing between the carriers in correspondence with the instantaneous slide geometry.

In a further developed form of the aforesaid solution the step plates have, in accordance with U.S. Pat. No. 4,276,976, grooved surfaces. The grooves produce a surface which is as free of interruption as possible by the inter-engaging of two adjacent step plates.

European Patent 0 225 213 discloses a solution with carriers which are telescopically variable in width. The carriers are connected amongst one another by way of a flexible element and an articulation lever pair. Lateral guides determine the length and the width of the carriers and thus the spacings therebetween. Carriers drawn out of one another produce a small spacing, and carriers pushed together create a large spacing.

In the case of all mentioned solutions relatively heavy and solid carriers are used, by means of which the loads of persons standing thereon are supported by way of rollers on outlying guide rails. The variations in the spacings between the carriers are produced by means of separate articulation levers with rollers and additional guide rails controlling these. Thus, two separate mechanical devices are needed for load support and for variation of the spacings between the carriers, which means a corresponding outlay of material and costs.

BRIEF DESCRIPTION OF THE INVENTION

The present invention is a solution to the task of simplifying the construction and drive of an acceleration travelling walkway. The invention is characterized in that several link chains, which are arranged parallel in the longitudinal direction and which are transversely connected at their joints by means of step plates and thus form a hexagonal articulated lattice variable in length and width and loadable by the load to be conveyed, are provided as carriers.

A high degree of operational safety of the travelling walkway is ensured by the simple and maintenance-friendly technology used. The short-pitch structure of the moving surface of the travelling walkway in the form of a scale carpet provides for a pleasant and secure step sensation for the users.

The parts of the articulated lattice and of the step plates are respectively required in very large piece numbers, so that investments for a fully automated production of these parts rapidly pay for themselves.

The travelling walkway of the invention has lateral guide rails, in which guide rollers connected with the articulated lattice run, wherein the shape and the course of the guide rails has the effect that the step plates remain parallel to one another in acceleration sections which couple slow and fast speed sections of the walkway. The pushing together and stretching of the lattice are forcibly caused by the speed difference between the slow and the fast sections.

The step plates serving as transverse connection straps are arranged to displaceably overlap one another longitudinally and transversely to the running direction and form, together with the articulated lattice as a support bed, a short-pitch, rolling scale carpet.

The articulation bearings may have at their underside a movable, embedded ball, which in multi-functional manner serves generally as a load support, as a roller on a smooth support bed, and as an entrainer on a correspondingly structured support bed.

Radially arranged cone rollers, between which the balls of the articulation bearings detente and, radially aligned, are entrained, may be provided for the horizontal deflection of the articulated lattice. The cone rollers can also have a special toothing or contouring in which the balls of the articulation bearings detente.

A drive belt with transverse grooves, which are arranged at close pitch and in which the balls detente to entrain the articulated lattice in a slip-free manner, may be provided for driving at low speed.

For sections with variable speed, drive belts with a smooth surface are provided, on which the balls can execute relative movement by rolling friction. These drive belts have speeds which lie between the low and the high speed or between the low and the deflection speed.

A drive belt with transverse grooves which are arranged at a wide pitch and in which the balls detente and thus the articulated lattice is entrained in slip-free manner, is provided for driving the walkway at high speed.

The stretching and pushing together of the articulated lattice provides a usable travelling walkway width wider in the slow travel section and narrower in the fast travel section, wherein the transition from the slow travel section to the fast travel section and conversely can be formed in a tapered or funnel-shaped arrangement.

BRIEF DESCRIPTION OF THE DRAWINGS

The invention is more closely explained in the following by reference to an example of an embodiment as set forth therein and illustrated in the drawings, in which.

DETAILED DESCRIPTION OF THE INVENTION

Figure 1:
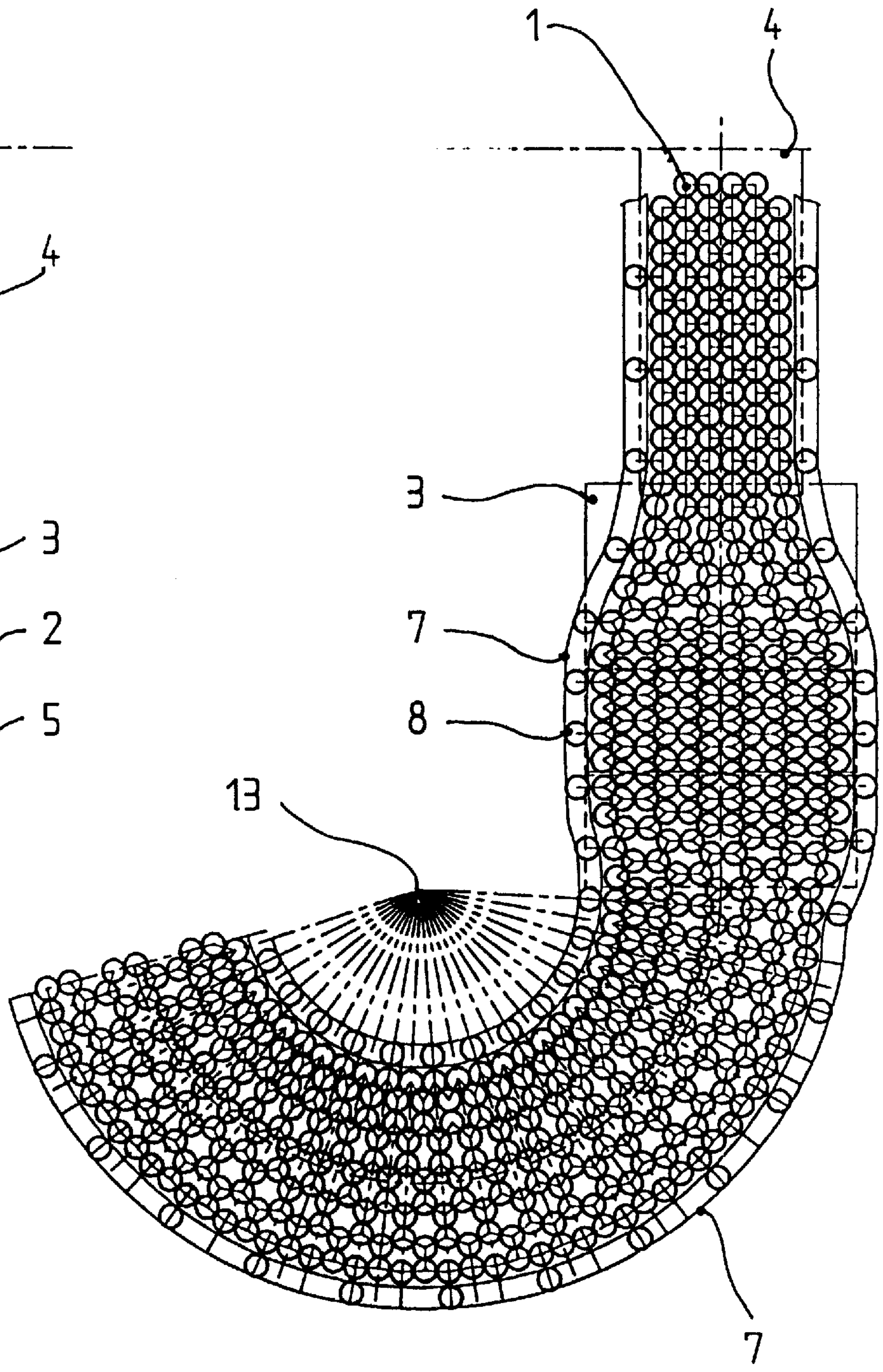
FIG. 1 shows a plan view of the articulated lattice of the present invention in a schematic illustration having a deflection section, a slow travel section, an acceleration section and a fast travel section.

An articulated lattice is designated by 1 in FIG. 1 and connected with laterally arranged guide rollers 8 which run in lateral guides 7. Travel of the lattice is counterclockwise. The guides 7 have the largest spacing relative to one another in the slow travel section, whereby the articulated lattice 1 is pushed together in the longitudinal direction. The guides 7 have the smallest spacing relative to one another in the fast travel section, in which the articulated lattice 1 is stretched. The spacing change of the guides 7 between the two travel sections has rounded transitions. A drive belt in the acceleration section is schematically signified by 3 and the drive belt for the fast travel section by 4. The articulated lattice 1 is guided in a horizontal deflection section about a center 13, wherein the outer chain elements of the articulated lattice 1 are stretched and the inner chain elements are pushed together. The extent of stretching and pushing together across the lattice is controlled by the radii for the inner and outer guides 7 about the center 13. The lattice 1 comprises link chains 15 forming a carrier for step plates 9.

Figure 2:
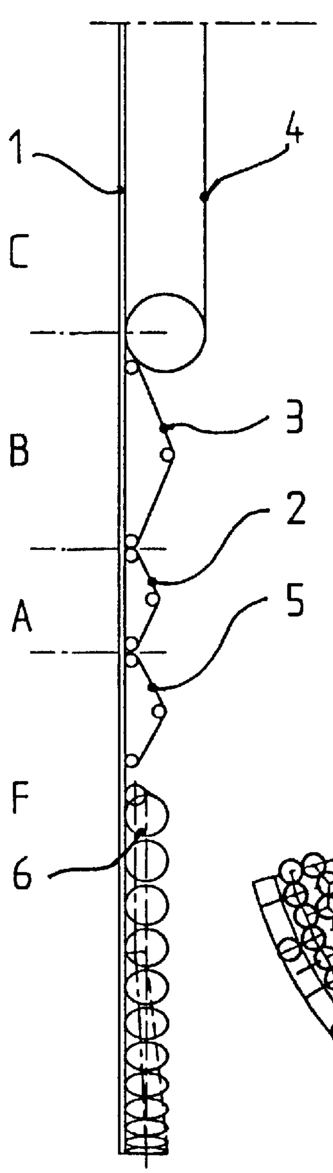
FIG. 2 shows a schematic side view of the construction of FIG. 1 with drive belts and deflecting rollers.

Further details of the sections, drives and deflection are schematically illustrated in side view in FIG. 2. The deflection section is designated by F1. In section F1, the articulated lattice 1 runs on circulating and deflecting devices such as cone rollers 6, and is supported and driven at the entry and exit of the deflecting section by a belt 5. The cone rollers 6 are radially arranged about the center 13 in the illustrated example and can run along with the engaging articulated lattice 1 or be themselves driven. The slow travel section A1 with a drive belt 2 for slip-free drive follows the deflection section. The next following acceleration section B1 is driven and supported by drive belt 3 with partly positive and partly negative slip, while the adjoining fast travel section C1 is driven by drive belt 4 in slip-free manner.

Figure 3B:
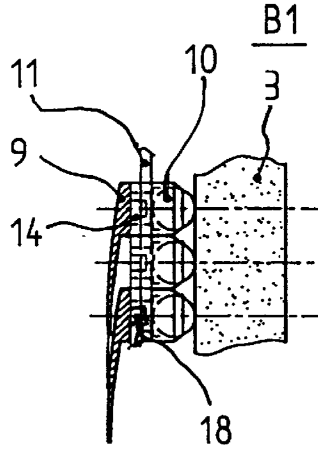
FIGS. 3*a* and *b* are top and cross-sectional views, which show details of the articulated lattice in association with step plates as used in acceleration and retardation sections, wherein the cross-section is taken through an articulation bearing.
Figure 3A:
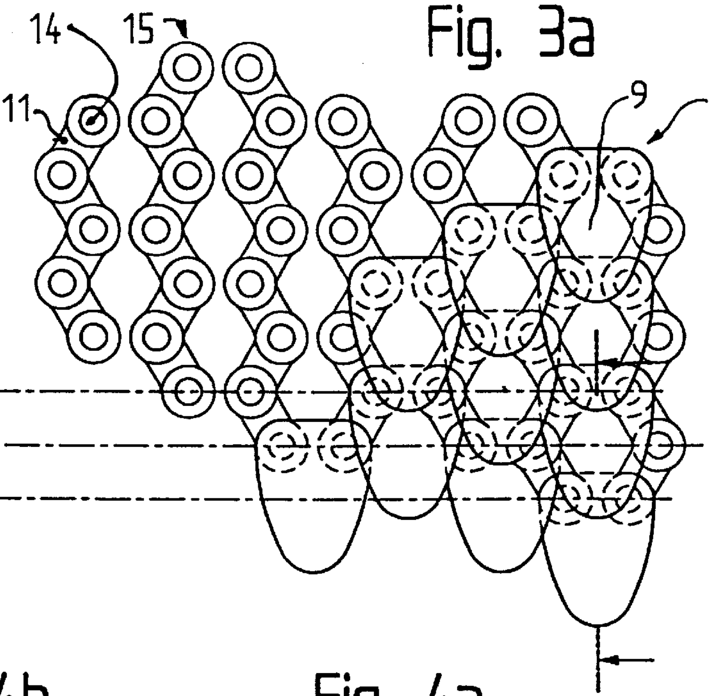

Details of the articulated lattice 1 are schematically illustrated in FIGS. 3*a* and 3*b*. The articulated lattice 1 consists of a number of individual link chains 15 arranged parallel to each other in the longitudinal direction. The link chains 15 are in turn formed from articulation bearings 14 movably joined by articulation straps 11. The articulation bearings 14 comprise at their underside a low-friction, embedded ball 10. Step plates 9, each of which are inserted in two laterally adjacent articulation bearings 14 to be rotationally movable and which for this purpose each have at their underside two vertical pins 18, provide transverse connections between the link chains 15 at the articulation bearings 14. The step plates 9 are scale-like in plan, the thickness of the plates decreasing towards their narrower forward ends. The shape and arrangement of the step plates enables, apart and in addition to a variable but constant overlap in the longitudinal direction, transient mutual overlap in the transverse direction. FIGS. 3*a* and *b* show the situation of the articulated lattice 1 in the section B1, in which the balls 10 are disposed on the drive belt 3 and can, by virtue of the smooth surface thereof, execute the necessary relative movements. The drive belt 3 has a speed which lies approximately midway between the low and the high conveying speed.

Figure 4B:
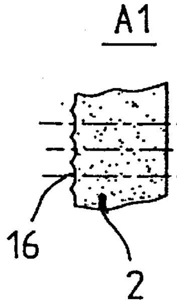
FIGS. 4*a* and *b* are top and side views of the articulated lattice in the slow travel section, inclusive of the surface structure of the associated drive belt.
Figure 4A:
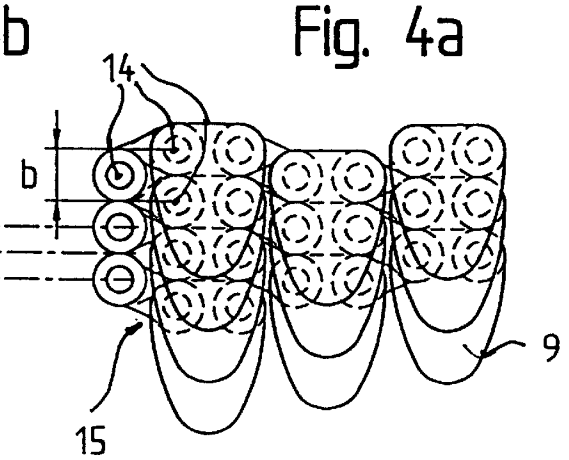

FIGS. 4*a* and 4*b* show the situation of the articulated lattice 1 in the slow travel section A1. Here, the articulated lattice 1 is pushed together to be closed in the longitudinal direction and accordingly has the largest transverse width with lowest speed. The associated drive belt 2 has transverse grooves 16 with the narrowest pitch for accommodation of the balls 10 of the bearings 14, resulting in the smallest longitudinal spacing b of the articulation bearings 14 of the link chains 15.

Figure 5B:
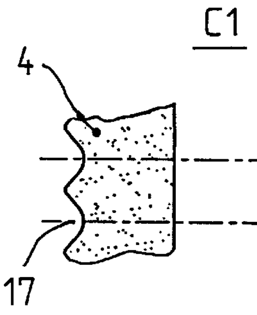
FIGS. 5*a* and *b* are similar views and show the articulated lattice in the fast travel section inclusive of the surface structure of the associated drive belt.
Figure 5A:
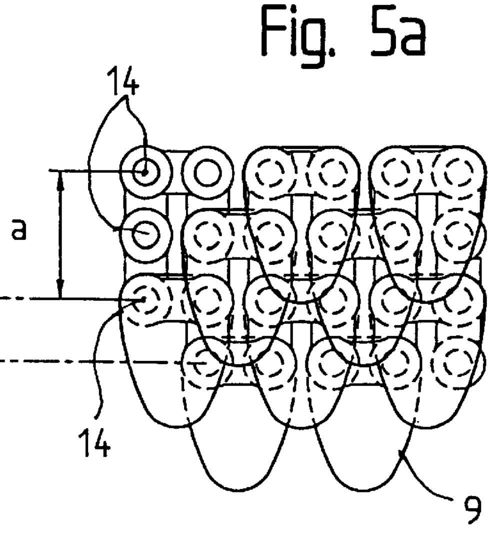

FIGS. 5*a* and 5*b* show the situation of the articulated lattice 1 in the fast travel section C1. Here, the articulated lattice 1 is stretched longitudinally and accordingly has the smallest width and highest speed. The associated drive belt 4 has transverse grooves 17 with the widest pitch, resulting in the largest longitudinal spacing a of the articulation bearings 14 of the link chains 15.

Figure 6:
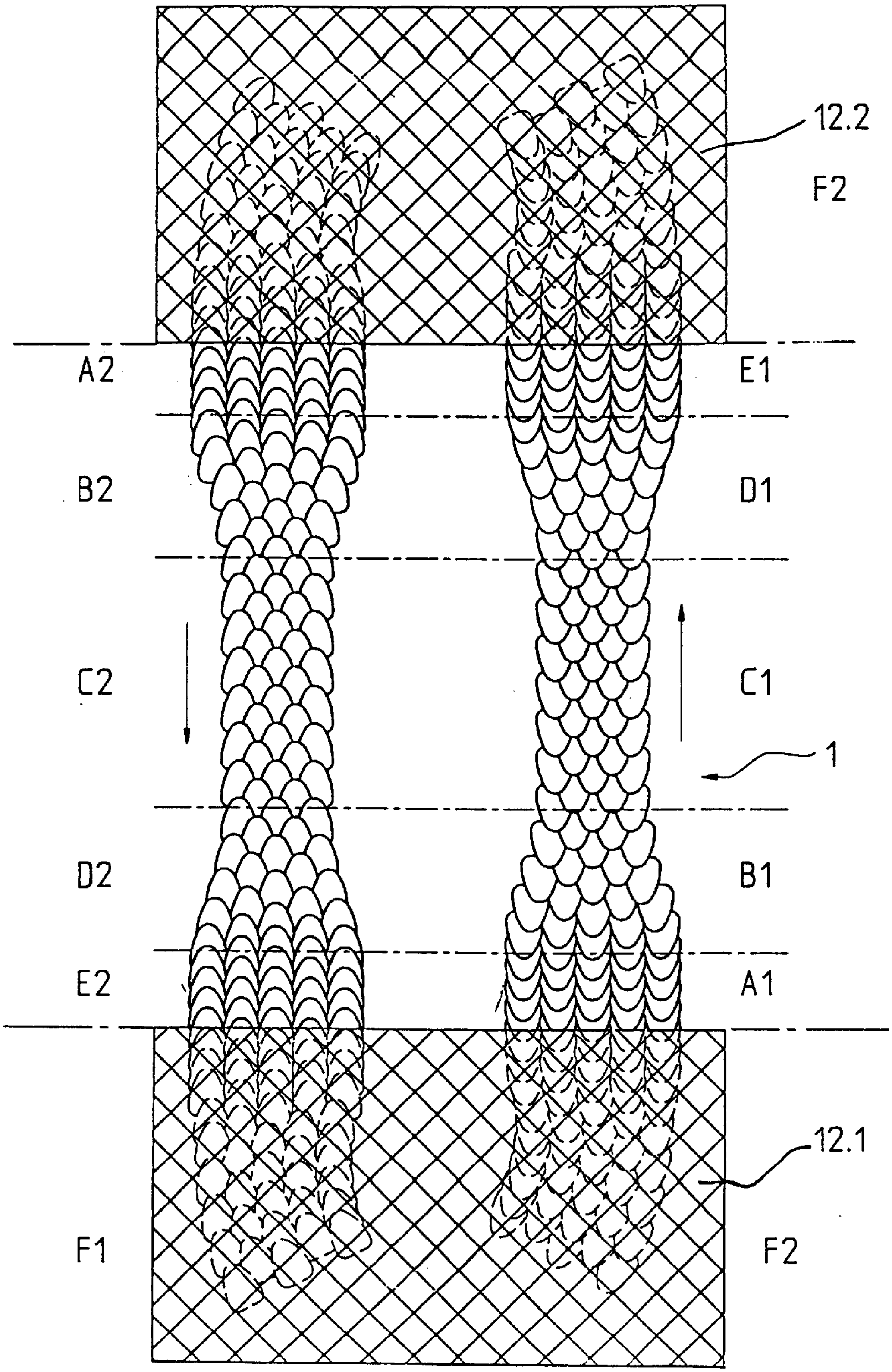
FIG. 6 shows an overall illustration of the acceleration travelling walkway with the different sections.

FIG. 6 shows an overall view of a travelling walkway according to the invention and particularly illustrates the following functional description. The following tables primarily enable an overview of the different functional sections and their respective significance.

| Section | Function |
|---|---|
| F1 | first deflection |
| A1 | slow travel |
| B1 | acceleration |
| C1 | fast travel |
| D1 | retardation |
| E1 | slow travel |
| F2 | second deflection |
| A2 | slow travel |
| B2 | acceleration |
| C2 | fast travel |
| D2 | retardation |
| E2 | slow travel |
| F1 | first deflection |

The function "first deflection" is disposed in section F1. The mechanical implementation of the first deflection is underneath an entry/exit walkway platform 12.1. The travelling walkway is stepped onto by way of this entry/exit walkway platform. The first step onto the movable part of the travelling walkway takes place in the section A1, in which the fully pushed-together step plates 9 on the articulated lattice 1 move at a constant slow rate of travel. The user of the travelling walkway is thus not immediately accelerated, having hardly stepped onto the travelling walkway. This measure is to be valued as providing additional safety and greater comfort in comparison to known systems. In the next section B1 the articulated lattice 1 is drawn out and thus stretched by the narrowing of the spacing between the guides 7 (see FIG. 1) and in this manner accelerated within the section to the fast travel speed. Section C1 is the actual main conveying section of the travelling walkway and can have almost any desired length. At the end of the fast travel section C1 the articulated lattice 1 is retarded to a slow travel speed in the deceleration/retardation section D1 by pushing together in the longitudinal direction by the widening of the spacing between the guides. After a short duration of slow travel in section E1 the second deflection section F2 is reached. This section is below the overlying entry/exit walkway platform 12.2. The travelling walkway is exited onto this walkway.

Figure 7:
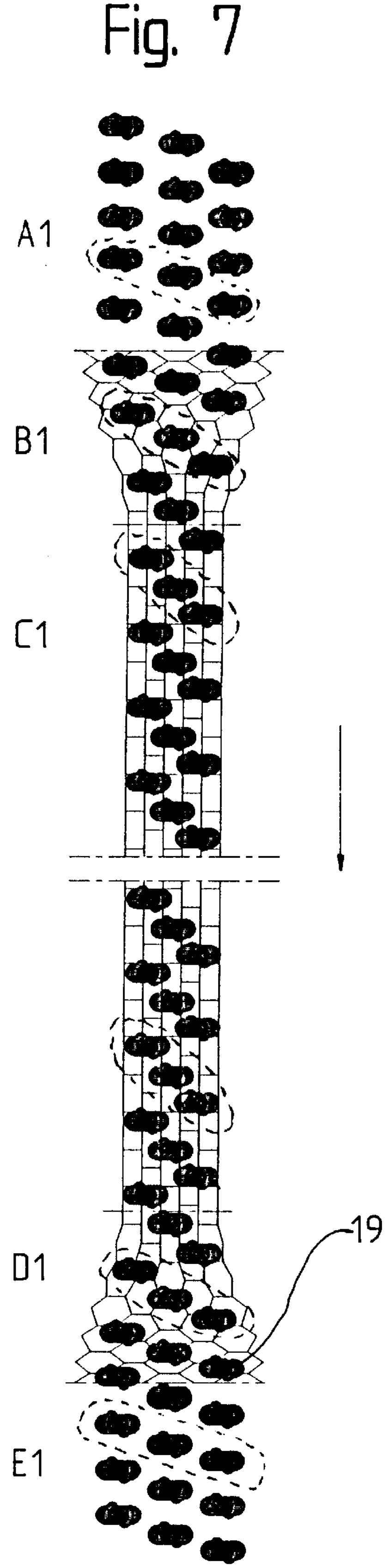
FIG. 7 shows an illustration of the carrying capacity of the acceleration travelling walkway according to the invention.

FIG. 7 shows that the usable width of the travelling walkway in the entry and exit walkway sections A1, E1, A2 and E2 is greater than in the fast travel sections C1 and C2.

Thus, generous space conditions are created in the entry and exit walkway sections A1, E1, A2 and E2, which facilitates stepping onto and departure from the travelling walkway in the case of heavy passenger traffic. Represented by 19 are persons using the acceleration travelling walkway. The widening and narrowing of the usable width takes place in the acceleration and retardation sections B1, D1, B2 and D2. Travelling in the opposite travel direction is analogous, but in a reverse sequence. In order to distinguish the opposite travel direction, the sections A to F having corresponding functions are provided with the ordinal number in FIG. 6 to designate the return direction.

Figure 8:
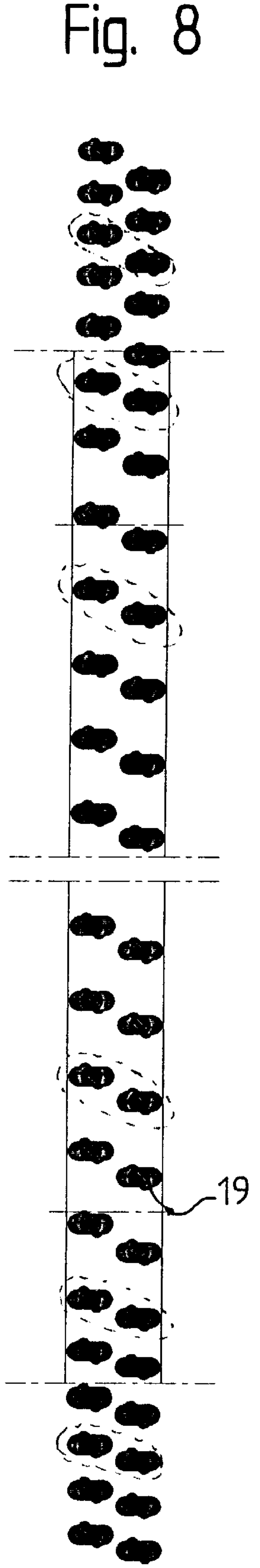
FIG. 8 shows an illustration of the carrying capacity of an acceleration travelling walkway without enlarged entry and exit zones.

FIG. 8 shows the disposition of a conventional acceleration travelling walkway with step plates displaceable merely in the travel direction without widened entry and exit zones. If it is assumed that the persons 19 move towards the travelling walkway simply in a line, then by comparison with FIG. 7 it can be easily recognized that the acceleration travelling walkway according to the invention has 50% more carrying capacity for the same travelling walkway width in comparison with that in FIG. 8. As the two illustrations clearly show, this is because the passengers according to FIG. 8 can step onto the travelling walkway in only a double column, but according to FIG. 7 can step onto the walkway in a triple column. During acceleration, no crowding amongst the passengers arises on the travelling walkway according to FIG. 7, because they are spaced from one another in the longitudinal direction.

The drive belts 2 and 4 with the transverse grooves 16 and 17 provide an effective drive for the travelling walkway (FIGS. 4 and 5). The transverse grooves 16 and 17, together with the engaging balls 10 of the articulation bearings 14, yield a mechanically positive connection with the drive and thus a slip-free transmission of movement to the articulated lattice 1. The similarly driven drive belt 3 with a smooth surface has a speed which lies approximately midway between the two speeds of the drive belts 2 and 4. It is the task of this drive belt 3, apart from the support function, of keeping as small as possible the movements of the balls 10 relative to the surface thereof. These relative movements result from the speed changes caused by acceleration and retardation.

The drive speeds of the drive belts 2 and 4 are matched to one another in the manner such that the articulated lattice 1 is fully stretched in the fast travel section C and fully pushed together in sections A and E. The difference of the two speeds is therefore a constant magnitude determined by the mechanism and consequently independent of the absolute magnitudes of the two speeds.

In the case of the deflections in the sections F1 and F2, the radially arranged cone rollers 6 are entrained by the driven articulated lattice 1. The cone rollers 6 have the task, through the engaging of the balls 10 between the cone rollers 6, of guiding the articulated lattice 1 in the radial arrangement around the center 13. The circulating cone rollers 6 are arranged in the deflection region of 180° on one plane and, ahead of the drive belt 5, are inclined downwardly out of engagement with the lattice in a known manner which is not illustrated and guided back to the deflection plane after an additional 180° angular movement. The cone rollers 6 can be provided with a drive if needed. To provide an additional notching or seating of the balls 10 in the cone rollers 6 the cone rollers may be provided with grooves, which are formed as circular grooves having radial spacings corresponding to the spacing of the balls 10 circulating about the center 13. The drive belt 5 has a similar function to the drive belt 3. Through a small narrowing of the guides 7 ahead of the deflection, further relative movements of the balls 10 on the similarly smooth surface of the belt 5 result, and thus the speed of the walkway is modified in accordance with criteria comparable to those for drive belt 3.

The step plates 9 have, in the overlapping region, low-friction surfaces, cross-sectional shapes and profiles which enable and promote the sliding over one another under load with the smallest possible frictional forces. That step plates 9, which are adjacent in transverse direction in sections B and C can be slid over one another is made possible by their offset in the longitudinal direction by the articulation straps 11. In the case of the stretched articulated lattice 1 which arises in section C with the step plates 9 being offset in the longitudinal direction by about half a step plate length, underlying cavities are created into which the following adjacent step plates can be pushed to create the resulting overlap. (See FIGS. 3 and 5).

The step plates 9 are advantageously produced as a solid product by known injection molding techniques, wherein for this purpose any desired metals and/or plastics or material combinations, which can be processed by such injection technology, can be utilized. Further parts suitable for economic mass production are elements 10, 11 and 14 of the link chains 15.

The drive belts 2, 3, 4 and 5 consist of usual flexible materials as known in the art and have, in accordance with their function, a structured (transverse grooves 16, 17) or smooth surface. The transport loads are accepted by support devices, such as rollers, (not illustrated) at their undersides, as generally known.

The cone rollers 6 at the deflection sections F1 and F2 can be replaced by any other means which fulfill the same functions of radial alignment and ordered deflection of the articulated lattice 1. For example, a flexible, radially grooved and flexible disc can be provided, with or without slide guidance at its outer edge. In one variant this disc may have a hole pattern, the grid pattern of which corresponds to the pattern and orientation of the ball 10.

In accordance with the present invention, travelling walkways produced with an articulated lattice 1 can be fabricated for all usual corridor widths and transport distances.

I claim:

1. A travelling walkway for conveying of persons, comprising at least one fast travel section having a high constant speed, at least one slow travel section having a low constant speed, and variable speed sections with variable speeds between the fast travel sections and the slow travel sections formed from pivotably interconnected carriers, wherein the length distances between the carriers can vary; and step plates, which overlap one another in the running direction of the travelling walkway and are displaceable relative to one another in a running direction of the travelling walkway, are mounted upon the carriers, and wherein a respective deflection of the step plates and carriers is provided at each end of the travelling walkway, characterized in that the pivotably interconnected carriers comprise at least three link chains arranged parallel in a longitudinal direction, a middle link chain being alternatively transversely connected at intervals to adjacent link chains by means of the step plates to form an articulated lattice of link chains joined by the step plates across a variable length and width.

2. A travelling walkway according to claim 1, wherein the spacing between the lateral guides in the transverse direction varies, whereby the width and length of the articulated lattice is varied by compression and expansion between the guides.

3. A travelling walkway according to claim 1, characterized in that the usable width in a slow travel section of the travelling walkway is larger than the usable width in a fast travel section and, a slow travel section and a fast travel section being joined by a tapered width variable speed section.

4. A travelling walkway according to claim 1 further comprising lateral guides for the articulated lattice, the articulate lattice including guide rollers guided by the lateral guides.

5. A travelling walkway according to claim 4, wherein the transverse spacing of the lateral guides in a fast travel section is less than the transverse spacing of the lateral guides in a slow travel section.

6. A travelling walkway according to claim 1, characterized in that the link chains comprise a series of articulation straps and articulation bearings, and that the step plates are rotationally movably mounted in the articulation bearings of adjacent link chains to enable a mutual displacing and overlapping of the step plates, both longitudinally and transversely to the travel direction of the articulated lattice.

7. A traveling walkway according to claim 6, further comprising walkway entry and walkway exit platforms, said platforms including circulating means for entraining and deflecting the articulated lattice by engagement of the articulation bearings.

8. A travelling walkway according to claim 6, characterized in that low speed drive means comprising a drive belt with transverse grooves in close pitch, in which the balls of the articulation bearings engage, is provided.

9. A travelling walkway according to claim 6, characterized in that a drive belt with transverse grooves in wide pitch, in which the balls of the articulation bearings engage, is provided as a slip-free high speed drive means.

10. A travelling walkway according to claim 6, characterized in that the articulation bearings of the link chains are each operatively connected with drive means through a ball.

11. A travelling walkway according to claim 5, characterized in that a drive belt with smooth surface means for enabling a rolling relative movement between the balls and belt surface, is provided as a variable speed section drive means.

* * * * *